United States Patent Office 3,425,902
Patented Feb. 4, 1969

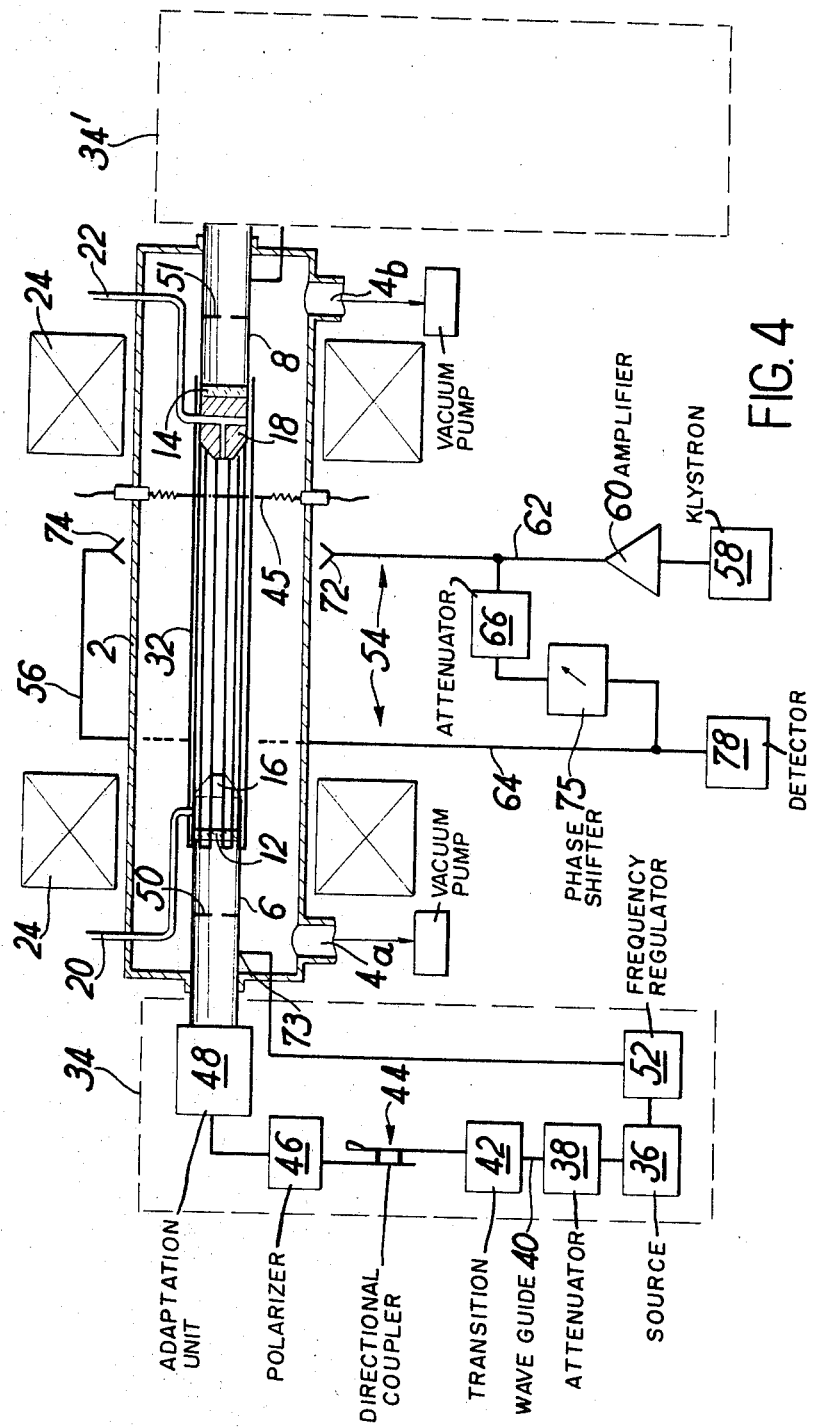

3,425,902
DEVICE FOR THE PRODUCTION AND CONFINEMENT OF IONIZED GASES
Terenzio Consoli, La Celle-Saint-Cloud, Lucien Dupas, Gif-sur-Yvette, and Jean Leroy, Le Perreux-sur-Marne, France, assignors to Commissariat à l'Energie Atomique, Paris, France
Filed Mar. 9, 1967, Ser. No. 621,942
Claims priority, application France, Mar. 11, 1966, 53,203
U.S. Cl. 176—7      3 Claims
Int. Cl. G21b 1/22

ABSTRACT OF THE DISCLOSURE

A method of production and confinement of an ionized gas wherein a non-ionized ionizable gas is passed into a chamber at one end of a discharge space in which the gas thus introduced is subjected to a magnetic field having a continuous axial component as well as a radial component having a minimum value in at least a central region and to a circularly polarized high-frequency wave higher than $10^9$ c./s., and a device for the application of said method.

---

This invention is directed to a device for the production and confinement of ionized gases. Among the different purposes which it may serve, the device according to the invention is of particular interest for the practical application of a known method for producing an accumulation of plasma consisting of electrons and ions while also increasing both the electron density and the energy which is stored. The aim of the device is to produce a continuous flux of fusion neutrons in the case in which the ionized gases are deuterium or tritium.

In accordance with the method referred-to above, a non-ionized ionizable gas is passed into an evacuated chamber at one end of a discharge space in which the gas thus introduced is subjected to a continuous magnetic field having an axial component which possesses symmetry of revolution in order to produce magnetic mirror effects near the ends of said space as well as a radical component having a minimum value in at least one symmetrically disposed region, and to a circularly polarized high-frequency wave having a frequency which is greater than $10^9$ c./s., wherein the electric vector of the high-frequency wave rotates in the same direction as the electrons under the action of the axial components of the magnetic field and yields energy to the ionized gas by cyclotron resonance effect in the mirror zone. The radial component of the magnetic field is either continuous or alternating and has a frequency higher than $10^6$ c./s.

The invention is directed to a device for the practical application of the above method, said device being characterized in that it comprises a chamber of generally cylindrical shape to which vacuum pumps are connected and into which a circular waveguide is adapted to penetrate for the purpose of conveying the high-frequency energy transmitted by a cooled window, said waveguide preferably terminating in an antenna which retains the circular polarization and through which the non-ionized ionizable gas is injected at one end of the discharge space. An assembly of pairs of symmetrically disposed coils makes it possible to produce the axial component of the magnetic field, said assembly being constituted by at least one pair of axial-field coils proper, one pair of coils for producing and controlling the magnetic mirror effect aforesaid, and one pair of coils for controlling the gradient of the axial field. Finally, an assembly of parallel conductors connected in series and disposed in the form of bars of a cylindrical cage which is coaxial with the discharge space serves to produce the radial magnetic field.

According to a preferred alternative embodiment, the method referred-to above is carried into effect by utilizing advice having a symmetrical structure in which two beams are directed towards each other, whilst the plasma which is formed remains confined between two magnetic mirrors as a result of the effect of the high-frequency electromagnetic field.

The device under consideration can also comprise a chamber of generally cylindrical shape to which vacuum pumps are connected but into which are adapted to penetrate both axially and symmetrically two circular waveguides for conveying high-frequency energy and each preferably containing a cooled window, said waveguides preferably terminating in circular-polarization antennae through which non-ionized ionizable gas is injected at each end of the discharge space. In this case also, use is made of an assembly of pairs of coils disposed symmetrically so as to produce the axial component of the magnetic field, said assembly being constituted by a pair of axial-field coils proper, a pair of coils for generating and controlling the axial field which produces a magnetic mirror effect, and a pair of coils for controlling the gradient of the axial field. Use is also made in this case of an assembly of parallel conductors forming an open-ended and coaxial cylindrical cage around the space which serves to produce the radial magnetic field.

As will be explained hereinafter, the magnetic fields of the high-frequency wave can be either continuous or pulsed.

Aside from these main arrangements, the invention is also concerned with a number of different secondary arrangements which will be referred-to herein-after and which relate to modes of execution of the device herein described for the application of the method according to the invention.

The utilization of a symmetrical device makes it possible to achieve particularly efficient transfer of high-frequency energy to the plasma as well as very high plasma density.

In order that the characteristic features of the invention may be more readily understood, there will now be described a device for confining ionized gas as contemplated by the invention, it being understood that no limitation is implied either in the modes of execution of the invention or in the uses to which it can be applied.

In the accompanying drawings:

FIG. 4 is a circuit diagram of one embodiment of a device according to the invention.

Figure 1C:
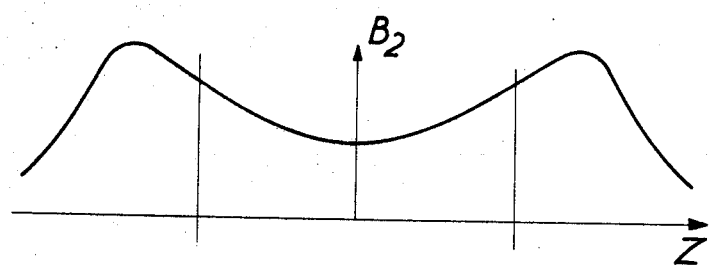
FIG. 1a shows the central portion of a device which, as contemplated by the present invention, is intended for the utilization of a known method, whilst the graphs 1b and 1c show the distribution of the axial magnetic field and of the high-frequency field along the discharge space.

The method which is carried into effect by means of the present invention is intended to subject an ionized gas to the simultaneous actions of two fields for the purpose of confining said gas and yielding energy thereto, viz:

(a) A continuous magnetic field having an axial component and a radial component each having a separate and distinct function and, (b) A high-frequency field.

The axial component of the magnetic field has a profile possessing symmetry of revolution and creates magnetic mirror effects near the ends of the discharge space. It can again be stated that said field has the profile of a magnetic bottle along the axis of the discharge space. The law of variation of this component along said axis is a law of the second degree in the simplest cases.

The radial component of the magnetic field has a minimum value in at least one central region which can be reduced to a point. This region corresponds either to the center of symmetry of the device employed or to its axis of symmetry. However, in the case of axial symmetry of the order $n$, the radial component can be of minimum value in a region which is located around the axis of symmetry of the device. This component is either continuous or has a frequency which is higher than $10^6$ c./s.

The high-frequency field is produced by a traveling wave having an angular frequency which is higher than $2\pi.10^9$ c./s. and circularly polarized; the polarization plane rotates about the axis of propagation in the same direction as the electrons under the action of the axial component of the magnetic field.

The high-frequency wave employed has a large amplitude and a high energy is associated therewith. The angular frequency of said wave is determined so that the phenomenon of cyclotron resonance can always take place in the case of the electrons in regions located in the vicinity of the magnetic mirrors.

Finally, in certain cases, the frequency of the wave is electrically regulated in such a manner as to adapt the operation of the generator to the load impedance constituted by the ionized medium in which said wave is propagated and absorbed.

The neutral gas is injected into the discharge space through the hyperfrequency antenna or antennae at a point slightly upstream of the regions in which there takes place the phenomenon of resonance between the frequency of the high-frequency wave and the electron "cyclotron" frequency. It will be recalled that said cyclotron frequency of a particle in a given magnetic field is the frequency of the natural rotational motion of the particle within the magnetic field under the influence of its perpendicular velocity.

As a result of the combined action of the electric field of the high-frequency wave and of the axial component of the magnetic field which are at right angles to each other, there is created an ionized medium in which the wave fields are damped. This results in the appearance fo an axial force $F_z$ which is directed from the zones of the magnetic mirrors towards the center of symmetry of the discharge space of the device employed.

Inasmuch as the high-frequency wave transmitted has the transverse mode, the transfer of energy which is conveyed by said wave to the electrons and to the ions can be practically complete.

It is known that, in this mode of propagation of circularly polarized waves:

(a) The angular frequency $\omega_{HF}$ of the wave is equal to or lower than the cyclotron angular frequency $\omega_{cy}$ of the electrons of the ionized gas and, (b) this angular frequency can also be substantially lower than the plasma frequency $$\omega_p{}^2 = \frac{Ne^2}{m\epsilon_o}$$

($N$=electron density of the plasma, $e$ and $m$=charge and mass of the electron and $E_o$ is the dielectric constant) and the phase velocity of the wave can be of the order of magnitude of the axial component of the electron velocity, which is highly conducive to the practically total yield of the wave energy to the plasma.

The utilization of the mode of transverse propagation of the polarized wave presents a further advantage in that it permits the injection of energy into plasmas having an electron density which is higher than the cut-off density $$\left(N_c = \frac{\omega^2 m \epsilon_o}{e^2}\right)$$

and reflection of the incident wave from a plasma of this type no longer occurs.

The axial force $F_z$ is applied primarily to electrons which carry the ions along in their motion under the effect of the space charge.

Due consideration being given to the resonance phenomenon already referred-to, the electrons have a substantial radial velocity whilst their axial velocity which arises from the high-frequency field gradient and from the continuous magnetic field gradient is relatively low.

It is apparent that the useful energy is that which corresponds to the axial velocity of the ions, the conversion of radial velocity to axial velocity being due in particular to the axial field gradient and also to the action of the continuous radial magnetic field. The ratio of the energies corresponding to the axial velocities of the ions and electrons is that of the masses of these particles $M/m$ when these axial velocities become equal and if the ionized gas is perfectly neutral electrically.

The completely ionized gas or plasma which has accumulated in the discharge space is confined radially as a result of the action of the radial and axial components of the magnetic field. The axial confinement of the electrons is obtined if the ratio $vt/va$ of the transverse velocity to the axial velocity of the electrons is maintained within limits such that the losses in the magnetic mirror zone are very small, the ions being retained by the charge space. In other words, it can also be stated that the axial confinement is the result of simultaneous actions of the high-frequency wave fields and of the axial component of the continuous magnetic field as a result of the resonance phenomenon.

Experience has shown that the best results were obtained by employing a symmetrical structure in which the gases are injected at both ends of the discharge space through the antennae from which are radiated two high-frequency waves directed towards each other.

Figure 1A:
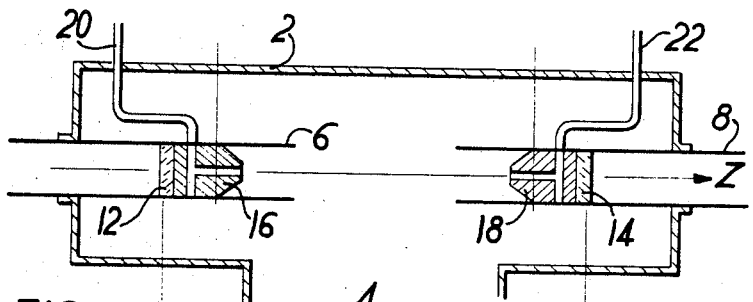

It will be noted that this arrangement is illustrated in FIG. 1a.

There is shown diagrammatically in this figure the cylindrical chamber 2 of the plasma confinement device provided with an opening 4 for establishing a communication with the vacuum pumps. Two circular wave-guides 6 and 8 disposed along the axis of the casing pass through the ends of this latter and serve to direct circularly polarized high-frequency waves towards the discharge space via the windows 12–14 and the antennae 16–18. It will be noted that the windows 12 and 14 can be subjected to powerful cooling by making use of the device which forms the subject of French Patent No. 1,478,501 and entitled "Method and device for the injection or removal of very high power values at very high frequencies." The non-ionized ionizable gas is injected into the discharge space through the antennae 16–18 and conveyed through the tubes 20–22. The length of the high-frequency wave employed can be comprised between very wide limits and in particular between 0.8 cm. and 25 cms. The optimum wavelengths are determined according to the power of available generators and various considerations relating to pumping and measurements.

The device which has just been described is equivalent to two accelerators each producing a plasma jet, ecah jet thus obtained being reflected from the structure which produces the other. The energy of the particles which move between the two resonance zones during successive oscillations increases until the said particles bring about fusion reactions at the center of the intermediate zone in which the high-frequency wave field is zero (assuming that complete absorption of the high-frequency energy has taken place) and in which there takes place the build-up of plasma which may be thermalized. Fusion reactions can take place within this intermediate zone or at the edge of the zone of interaction of the two beams.

Figure 1B:
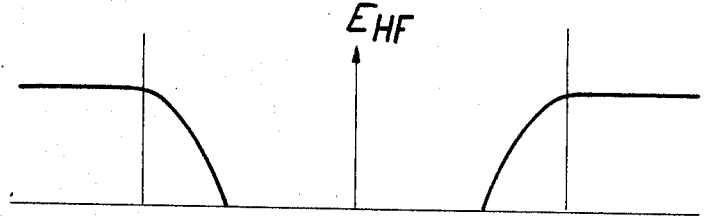

The diagrams of FIGS. 1b and 1c represent respectively as a function of the position along the axis of the device (Z-axis) the amplitude of the electric field $E_{HF}$ of the high-frequency wave as well as the amplitude of the axial component $B_z$ of the magnetic field.

It will be noted that FIG. 1a and the two graphs FIGS. 1b and 1c have been drawn to a common scale with respect to the Z-axis.

Each accelerator is a high-frequency anti resonance element with respect to the other and modifies in an uninterrupted manner the distribution of velocities of electrons in the mirror zone. The result thereby achieved is a stabilizing effect which has made it possible by experiment to obtain and build-up a plasma having a density which is ten times the cut-off density without observing as a consequence any loss of plasma resulting from instability.

There will now be described a device which has been constructed by the present applicants (as shown in FIG. 4) and which has enabled the applicants to obtain satisfactory results; this apparatus is of the same type as the device shown in FIG. 1a. It will be noted that similar elements in both figures are designated by the same reference numerals.

Figure 2:
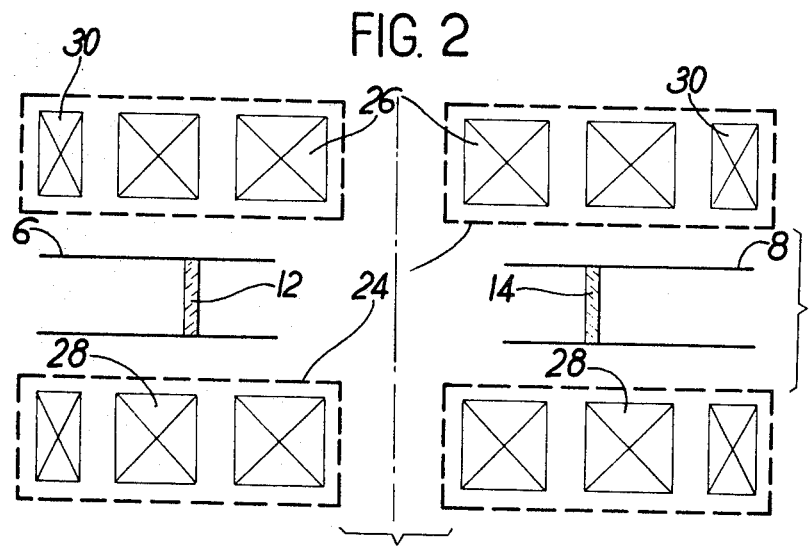
FIG. 2 is a general arrangement diagram which serves to illustrate the structure of the magnetic coils which produce the axial field.

In this embodiment, the single duct 4 which provides a communication with the vacuum pumps has been replaced by two ducts 4a and 4b. The axial magnetic field is produced by the pair of assemblies 24 as shown in detail in FIG. 2.

It is observed that each portion of the assembly 24 is constituted by a group of three coils having symmetry of revolution and positionally adjustable. The coils 26 have the function of producing the axial field and the coils 28 carry a variable current in order to control the magnetic mirror effects of the axial field. Finally, the coils 30 which are also supplied with variable current serve to control the gradient of the axial field; corresponding pairs of coils are placed symmetrically with respect to the transverse plane of symmetry of the device. The current supplied to the coils is strictly stabilized.

In the device of FIG. 4, the radial magnetic field is produced by the cylindrical coil 32 constituted by a conductor which is bent back in a Greek key or fret configuration. The coil must be fairly long in order to penetrate within the zones in which the magnetic mirror effect appears and to extend beyond the zones of injection of the high-frequency field, these zones being limited by the windows 12 and 14. A better understanding of the structure of the coil 32 will be gained by reference to FIG. 3, in which said coil is shown on a larger scale in FIG. 3a and in an alternative form of construction in FIG. 3b.

The disadvantage of a coil of the type shown in FIG. 4 is that it hinders the pumping which must be performed through the rectilineal conductors which surround the waveguides.

By way of alternative, use can be made of a radial-field generating unit (FIG. 3b) made up of three coaxial coils 67–68–70, the conductors which constitute these cylindrical coils having the shape of Greek keys having a width corresponding to an angle at the center which is identical with that of the Greek keys of the coil 32.

The two end coils 67–68 have the same diameter as said coil 32 while the central coil which surrounds the discharge space has twice the diameter. The conductors 69 which constitute the coil 70 can be either divided or bent inwards. The length of the complete unit of FIG. 3b is identical with that of the simple coil (FIG. 3a).

Figure 3B:
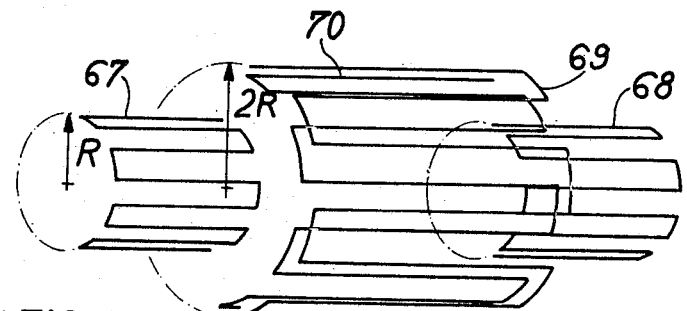
FIG. 3a and 3b are diagrams showing two alternative forms of the device employed for producing the radial component of the magnetic field.
Figure 3A:
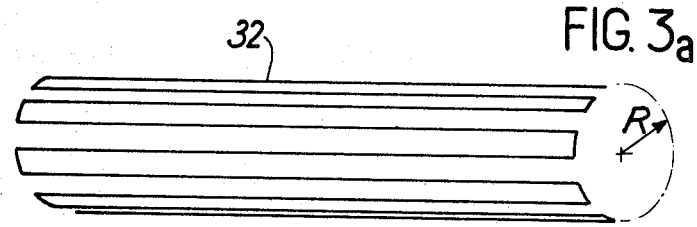

In the case of FIG. 3b, the conductors of each of the end coils as well as the conductor or group of two conductors of the intermediate coil carry the same current, which presupposes a constant radial field within the discharge space.

Finally, in order to improve the pumping conditions, it is possible to increase the transparency of the radial-field generating unit by increasing at the same time and in the same proportion the radius of the coil unit 70 and the number of conductors which are associated in parallel, in which case the magnetic field produced remains identical.

This unit produces a gradient of the radial field which is favorable to the confinement of the plasma.

The two waveguides 6 and 8 are supplied respectively from devices 34 and 34' which are of identical construction, and only one of which will therefore be described. Said device accordingly comprises a source 36 which delivers by way of an attenuator 38 into a rectangular-section waveguide 40 coupled to a transition device 42 between said rectangular-section wave guide and circular-section waveguide; this latter is coupled to the main channel of a directional coupler 44, the secondary channel of which is coupled to a polarizing device 46 which supplies the waveguide 6 by way of an adaptation unit 48. Irises 50 and 51 which are disposed in the waveguides make it possible to adjust the dimensions of the zone in which the plasma is formed.

The device 52 which is coupled to the waveguide 6 serves to regulate the frequency of the source 36 according to the impedance shown at 73.

The measuring element 45 is a target constituted by a tungsten or graphite filament which is observed with the aid of an optical pyrometer (not shown) for the purpose of determining its temperature, from which it is possible to deduce the amount of energy stored in the plasma.

Finally, the density of the plasma is measured by means of the interferometer 54, said density being a function of the transparency of the plasma with respect to a hyper-frequency wave. Said wave is produced by a klystron 58, amplified at 60, transmitted by the waveguide 62 to the antenna 72 from which it is radiated in the direction of the plasma, then received by the antenna 74 and finally directed by the waveguide 64 to the detector 78. Said detector also receives the wave which is transmitted from the waveguide 62 to the waveguide 64 via an attenuator 66 and a phase shifter 75. The mixture within the detector 78 of waves derived from the antenna 74 and waveguide 62 via the units 66–74 makes it possible to deduce said transparency, than the density of the plasma.

The fields applied to the ionizable gas which is intended to form the plasma can be pulse-modulated.

What we claim is:

1. A device for the production and confinement of an ionized gas comprising a chamber of generally cylindrically shape, vacuum pumps connected to said chamber, a circular wave guide at each end of said chamber mounted axially in said chamber conveying high frequency energy, a cooled window in each of said wave guides, a circular polarization antenna attached to the extremity of each of said wave guides through which a non-ionized ionizable gas is injected, an assembly of three pairs of symmetrically disposed coils around said chamber comprising one pair of coils for producing an axial magnetic field, one pair of coils for producing and controlling a magnetic mirror effect arising from the axial field and one pair of coils for controlling the gradient of said axial field and a symmetrical assembly of parallel conductors forming at least one coaxial open-ended cylindrical cage around the discharge space in said chamber producing a radial magnetic field.

2. A device as claimed in claim 1, wherein the radial magnetic field is produced by parallel conductors associated in series, the cylindrical cage formed by said conductors having a diameter at least equal to the diameter of the circular waveguides and substantially the same length as the space formed between the windows which are disposed in said circular waveguides.

3. A device as claimed in claim 1, wherein the magnetic fields and the high-frequency wave are pulse-modulated.

References Cited

UNITED STATES PATENTS 3,160,566  12/1964  Dandl et al. _____ 176—1

REUBEN EPSTEIN, *Primary Examiner.*

U.S. Cl. X.R.

176—3; 315—111; 313—161